United States Patent
Lais et al.

(10) Patent No.: US 11,410,550 B2
(45) Date of Patent: Aug. 9, 2022

(54) WARNING MESSAGE ROUTING FOR INFRASTRUCTURES

(71) Applicant: Siemens Schweiz AG, Zürich (CH)

(72) Inventors: Christian Lais, Obfelden (CH); Oliver Zechlin, Zug (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 16/967,891

(22) PCT Filed: Jan. 15, 2019

(86) PCT No.: PCT/EP2019/050943
§ 371 (c)(1),
(2) Date: Aug. 6, 2020

(87) PCT Pub. No.: WO2019/154597
PCT Pub. Date: Aug. 15, 2019

(65) Prior Publication Data
US 2021/0056841 A1 Feb. 25, 2021

(30) Foreign Application Priority Data
Feb. 9, 2018 (DE) .................... 10 2018 202 036.1

(51) Int. Cl.
*G08G 1/0962* (2006.01)
*H04W 4/40* (2018.01)
(Continued)

(52) U.S. Cl.
CPC ........... *G08G 1/0962* (2013.01); *H04L 67/12* (2013.01); *H04W 4/40* (2018.02); *H04W 64/00* (2013.01); *H04W 76/10* (2018.02); *H04W 88/16* (2013.01)

(58) Field of Classification Search
None
See application file for complete search history.

(56) References Cited

U.S. PATENT DOCUMENTS

| 9,852,599 B1* | 12/2017 | Slavin ................... G08B 21/043 |
| 2012/0193110 A1* | 8/2012 | Bouthors .............. B61L 25/025 |
| | | 169/46 |
| 2017/0178520 A1 | 6/2017 | Papageorgiou .......... G08G 5/04 |

FOREIGN PATENT DOCUMENTS

| DE | 10 2005 035 242 | 2/2007 | ............. G08G 1/052 |
| DE | 10 2010 021 841 | 12/2011 | ............... G08G 1/01 |

(Continued)

OTHER PUBLICATIONS

Search Report for International Application No. PCT/EP2019/050943, 12 pages, dated Apr. 15, 2019.

*Primary Examiner* — Adolf Dsouza
(74) *Attorney, Agent, or Firm* — Slayden Grubert Beard PLLC (57) ABSTRACT

This disclosure describes an infrastructure management system and method for identifying risk potentials within the infrastructure or for the infrastructure. A dedicated sensor system for identifying risk potentials is provided within the infrastructure or for the infrastructure. A gateway (for example an interface) is configured to receive sensor values that originate from sensors of mobile devices that are temporarily located within the infrastructure or within a defined range (radius) from the infrastructure. A processing unit (for example a server) is configured to receive the sensor values that are reported by the dedicated sensor system and to receive the sensor values of the mobile devices that are provided by the gateway and further to analyze the received sensor values in order to identify risk potentials for the infrastructure or within the infrastructure.

13 Claims, 2 Drawing Sheets

(51) Int. Cl.
*H04W 76/10* (2018.01)
*H04L 67/12* (2022.01)
*H04W 64/00* (2009.01)
*H04W 88/16* (2009.01)

(56) References Cited

FOREIGN PATENT DOCUMENTS

| | | | | |
|---|---|---|---|---|
| DE | 10 2013 213 583 | 1/2015 | ............... | G08G 1/01 |
| WO | 2011 140592 | 11/2011 | ............... | G08G 1/16 |

\* cited by examiner

WARNING MESSAGE ROUTING FOR INFRASTRUCTURES

CROSS-REFERENCE TO RELATED APPLICATIONS

This application is a U.S. National Stage Application of International Application No. PCT/EP2019/050943 filed Jan. 15, 2019, which designates the United States of America, and claims priority to DE Application No. 10 2018 202 036.1 filed Feb. 9, 2018, the contents of which are hereby incorporated by reference in their entirety.

TECHNICAL FIELD

The present disclosure relates to infrastructure management systems. Various embodiments include methods for identifying risk potentials within an infrastructure or for an infrastructure and/or gateways for receiving sensor values and notifications.

BACKGROUND

Infrastructures, in particular so-called "critical infrastructures" (for example tunnels, factory installations with hazardous substances, waterworks, ferries) must react to numerous hazard warnings in order to avoid damage and to minimize risks. Due to the technical design, the hazard types change or increase over time. Commercial buildings or areas and also infrastructure facilities are mostly protected against hazards by fire alarm systems for example or also by access control facilities and perimeter protection facilities.

Tunnel installations are mentioned as an example: in the case of well-protected installations, approaching trucks are "scanned" by means of thermal imaging cameras or similar sensors in order to be able to identify prior to entering the tunnel whether said trucks or technical components of said trucks such as a brake system or internal combustion engine pose a risk. Should, for example, the brake system have thermal irregularities, it is still possible to stop the truck prior to its entering the tunnel (in other words the critical infrastructure) in order to prevent an accident and fire in the tunnel. Generally, sensors that are part of the infrastructure and are accordingly installed identify on-site a risk or the data that is recorded by sensors, or sensor values may be evaluated for risk identification. The information recorded by sensors is evaluated and if need be reacted to. The European patent application EP1060766A1 describes a facility for so-called hot spot detection in order to identify hot runners on bogies of trains prior to the trains entering a tunnel. This type of risk identification is static and it is not possible to react in a flexible manner to changing risks or risk potentials.

SUMMARY

The teachings of the present disclosure describe cost-effective systems and/or methods with which in particular risks or risk potentials that are changing over time are identified in a flexible and reliable manner within an infrastructure or for an infrastructure. For example, some embodiments include an infrastructure management system for identifying risk potentials within an infrastructure (IS1, IS2) or for an infrastructure (IS1, IS2), the infrastructure management system comprising: a dedicated sensor system (SK1, SK1', SK1") for identifying risk potentials within the infrastructure (IS2, IS2) or for the infrastructure (IS1,IS2); a gateway (G1, G2) configured to receive sensor values (SW2) that originate from sensors (SK2, SK2', SK2", SK2''') of mobile devices (MG1-MG4) that are temporarily located within the infrastructure (IS1, IS2) or within a defined range from the infrastructure (IS1, IS2); and a processing unit (VE1, VE2) configured to receive the sensor values (SW1) that are reported by the dedicated sensor system (SK1, SK1', SK1"), and configured to receive the sensor values (SW2) of the mobile devices (MG1-MG4) that are provided by the gateway (G1, G2), and further configured to analyze the received sensor values (SW1, SW2) in order to identify risk potentials for the infrastructure (IS1, IS2) or within the infrastructure (IS1, IS2).

In some embodiments, mobile devices (MG1-MG4) are configured such that they automatically connect to the gateway if they are located within the infrastructure (IS1, IS2) or within a defined range (radius) from the infrastructure (IS1, IS2).

In some embodiments, the mobile devices (MG1-MG4) are configured such that they only connect to the gateway (G1, G2) after the device has provided confirmation.

In some embodiments, a connection between the gateway (G1, G2) and a mobile device (MG1-MG4) only takes place after confirmation by the gateway (G1, G2).

In some embodiments, the infrastructure (IS1, IS2) is a tunnel, a multi-level parking lot, an underground garage, a parking garage, a campus or a ferry.

In some embodiments, the mobile device (MG1-MG4) is a vehicle.

In some embodiments, the mobile device (MG1-MG4) is a mobile communication terminal.

In some embodiments, the gateway (G1, G2) is configured to receive notifications (M) from a vehicle-to-vehicle server and/or from a traffic management computer (LS1, LS2), and the processing unit (VE1, VE2) is configured, during the analysis of the risk potential for the infrastructure (IS1, IS2) or within the infrastructure (IS1, IS2), to take into consideration the notifications (M) that are received from the vehicle-to-vehicle server (V2V-S) or from the traffic management computer (LS1, LS2).

As another example, some embodiments include a gateway (interface) configured to receive sensor values (SW2) that originate from sensors (SK2, SK2', SK2", SK2''') of mobile devices (MG1-MG4) that are temporarily located within an infrastructure (IS1, IS2) or within a defined range from the infrastructure (IS1, IS2); and further configured so as to transmit the received sensor values (SW2) to a processing unit (VE1, VE2).

In some embodiments, the gateway (interface) is further configured to receive notifications (M) from a vehicle-to-vehicle server (V2V-S) and/or from a traffic management computer (LS1, LS2) and to transmit said notifications to the processing unit (VE1, VE2).

As another example, some embodiments include a method for identifying risk potentials within an infrastructure (IS1, IS2) or for an infrastructure (IS1, IS2), the method comprising: providing first sensor values (SW1) from a sensor system (SK1, SK1', SK1") that is dedicated to the infrastructure; providing second sensor values (SW2) from mobile devices (MG1-MG4) that are temporarily located within the infrastructure (IS1, IS2) or within a defined range from the infrastructure (IS1, IS2); and analyzing the first and the second sensor values (SW1, SW2) in order to identify risk potentials for the infrastructure (IS1, IS2) or within the infrastructure (IS1, IS2).

In some embodiments, the second sensor values (SW2) are provided by a vehicle (MG1-MG4) and/or by a mobile communication terminal.

In some embodiments, notifications that are provided by a vehicle-to-vehicle server (V2V-S) and/or by a traffic management computer (LS1, LS2) are also taken into consideration for identifying risk potentials for the infrastructure (IS1, IS2) or within the infrastructure (IS1, IS2).

In some embodiments, notifications that are provided by a mobile device (MG1-MG4), which is networked to other mobile devices (MG1-MG4), are taken into consideration for identifying risk potentials for the infrastructure (IS1, IS2) or within the infrastructure (IS1, IS2).

BRIEF DESCRIPTION OF THE DRAWINGS

The teachings herein and various embodiments thereof are explained using the example of the following figures. In the drawings.

DETAILED DESCRIPTION

Various embodiments incorporating teachings of the present disclosure include an infrastructure management system for identifying risk potentials within the infrastructure or for the infrastructure, the infrastructure management system comprising: a dedicated (static, installed) sensor system for identifying risk potentials within the infrastructure or for the infrastructure; a gateway (interface), configured to receive sensor values that originate from sensors of mobile devices that are temporarily located within the infrastructure or within a defined range (radius) from the infrastructure; and a processing unit (server), configured to receive the sensor values that are reported by the dedicated sensor system, and configured to receive the sensor values of the mobile devices that are provided by the gateway, or the sensor values that are provided by the sensor system of the mobile devices, and further configured to analyze the received sensor values in order to identify risk potentials for the infrastructure or within the infrastructure.

In some embodiments, the sensor system (for example cameras, temperature sensors, smoke detectors) is mostly statically installed in infrastructures (for example parking garages, ferries, tunnels) for identifying risks and is temporarily augmented with a sensor system of mobile devices (for example motor vehicles, trains) that are only temporarily located in the infrastructure or are approaching the infrastructure (for example a train or motor vehicle is traveling through the tunnel) in order to identify more quickly risk potentials for the infrastructure. As a consequence, inter alia the reaction time window is extended in order to render possible a quick reaction to identified potential hazards or risks. Mobile sensors that are not part of the fixedly installed sensor inventory (for example smoke detectors of the fire alarm system) of the infrastructure and are only temporarily located around or in the infrastructure are used in cooperation with the dedicated sensor system that is provided in the infrastructure for minimizing the risks of the infrastructure, and their sensor values are used for identifying risk potentials. The present invention renders it possible to augment the sensor system provided for an infrastructure by a mobile or temporary sensor system of the mobile devices.

In some embodiments, the mobile devices (for example motor vehicle, train, mobile communication terminal (for example a smartphone)) are configured to automatically connect to the gateway if they are located within the infrastructure or within a defined range from the infrastructure, for example in a defined radius around the infrastructure or within a defined range from an entrance into the infrastructure. An exemplary radius or distance may be 300 m for example. The mobile devices may be registered for example in the case of an infrastructure operator or in the case of a web portal of the infrastructure operator. A wireless network (for example WLAN, Bluetooth) is advantageously located in the defined radius or within the defined distance on the way to the entrance into the infrastructure and the mobile devices automatically dial into said wireless network when they are in relevant proximity. The respective mobile devices are automatically connected to the gateway without the owners of the corresponding mobile devices having to interact.

In some embodiments, the mobile devices only connect to the gateway after the device has provided confirmation. In such embodiments, it is ensured that the mobile devices are only connected to the gateway if the owner has previously approved.

In some embodiments, a connection between the gateway (interface) and a mobile device only takes place after confirmation by the gateway. In such embodiments, the operator of the infrastructure may selectively choose those mobile devices that have sensor systems they wish to incorporate or use.

In some embodiments, the infrastructure is a tunnel, a multi-level parking lot, an underground garage, a parking garage, a campus or a ferry. The infrastructure management system for identifying risk potentials may be used in a flexible manner for infrastructures in which vehicles or humans with mobile communication terminals (for example a smartphone) are temporarily located.

In some embodiments, the mobile device is a vehicle (for example train, car, truck). Vehicles usually have cameras or temperature sensors for example as sensors. Railroad cars are usually equipped with smoke and/or fire detectors. This sensor system may be used for identifying risk potentials within the infrastructure or for the infrastructure.

In some embodiments, the mobile device is a mobile communication terminal (for example a smartphone). Mobile communication terminals are equipped with sensor systems (for example GPS, movement sensors, camera, barometer, temperature sensor) that may be used for identifying risk potentials within the infrastructure or for the infrastructure. Furthermore, notifications regarding risks or hazards may be transmitted to the gateway of the infrastructure management system via voice messages or text messages using a mobile communication terminal.

In some embodiments, the gateway is configured to receive notifications from a vehicle-to-vehicle server and/or from a traffic management computer and that the processing unit (server) is configured, when analyzing the risk potentials for the infrastructure or within the infrastructure, to use or to take into consideration notifications that are received from the vehicle-to-vehicle server or from the traffic management computer. As a consequence, further information may be used for identifying risk potentials for an infrastructure (for example a tunnel). Vehicle-to-vehicle communication or car-to-car communication is becoming ever more widespread. The information (for example notifications) from a collaborative vehicle network may be transmitted to the gateway or from individual vehicles by a vehicle-to-vehicle server to which the vehicles are accordingly connected with regard to data transmission. Traffic management computers may transmit further information to the gateway or directly to the processing unit (for example reports regarding a high volume of traffic on approach routes to the infrastructure or notifications regarding heavy loads or hazardous loads that are located on the approach routes to the infrastructure). Weather information (in particular weather forecasts regarding the spatial area in which the relevant infrastructure is located) is also advantageously transmitted to the gateway or directly to the processing unit by weather stations or weather services and is used for determining the risk potential for the infrastructure.

In some embodiments, a gateway (interface) is configured to receive sensor values that originate from sensors of mobile devices that are temporarily located within an infrastructure or within a defined range (radius) from the infrastructure, and further configured to transmit the received sensor values to a processing unit. The mobile devices are for example vehicles (for example motor vehicles, trains) but also mobile communication terminals (for example a smartphone) for example of occupants of the vehicles. The mobile devices comprise sensor systems, for example cameras, trains usually also comprise smoke detectors, fire detectors and temperature sensors. In some embodiments, the gateway comprises a wireless interface (for example GMS, WLAN, internet hot spots), which may be used for transmitting to the gateway the respective sensor values that are recorded by the respective sensor system.

In some embodiments, the communication connection between the sensor system and the gateway only automatically takes place (for example by way of a defined communications protocol) if the sensor system or the mobile device is located within a defined range from the infrastructure. The sensor values that originate from the sensor system that is installed in the infrastructure or originate from the sensor system that is part of the infrastructure in a dedicated manner may be transmitted to the gateway in a wireless manner (for example by way of a wireless connection) or in a wire-connected manner (in other words by way of corresponding cabling).

In some embodiments, the gateway is configured to receive notifications from a vehicle-to-vehicle server and/or from a traffic management computer and to transmit said notifications to the processing unit. As a consequence, further information may be used for identifying risk potentials for an infrastructure (for example a tunnel).

In some embodiments, there is a method for identifying risk potentials within an infrastructure (for example a tunnel, multi-level parking lot, ferry) or for an infrastructure, the method comprising: providing first sensor values from a (static, installed) sensor system that is dedicated to the infrastructure; providing second sensor values from mobile devices that are temporarily located within the infrastructure or within a defined range (radius) from the infrastructure; and analyzing the first and the second sensor values in order to identify risk potentials for the infrastructure or within the infrastructure. In order to identify the risk potentials for an infrastructure, the sensor system that is provided in the infrastructure (in a tunnel, for example installed fire detectors or installed cameras) is augmented with a sensor system that is temporarily located in the infrastructure or in an area around the infrastructure.

In some embodiments, the second sensor values are provided by a vehicle and/or by a mobile communication terminal. The mobile devices are for example vehicles (for example motor vehicles, trains) but also mobile communication terminals (for example a smartphone) for example of occupants of the vehicles. The mobile devices are for example vehicles (for example motor vehicles, trains) but also mobile communication terminals (for example a smartphone) for example of occupants of the vehicles. The mobile devices comprise sensor systems, for example cameras, trains usually also comprise smoke detectors, fire detectors and temperature sensors.

In some embodiments, notifications that are provided by a vehicle-to-vehicle server and/or by a traffic management computer are also used or taken into consideration for identifying risk potentials for the infrastructure or within the infrastructure. As a consequence, further information may be used for identifying risk potentials for an infrastructure (for example a tunnel).

In some embodiments, notifications that are provided by a mobile device (vehicle), which is networked to other mobile devices (vehicles), are also used or taken into consideration for identifying risk potentials for the infrastructure or within the infrastructure. Vehicles may communicate with one another (vehicle-2-vehicle communication) and exchange hazard levels and provide this information to the gateway or directly to the processing unit (in particular directly to the computer of the processing unit). This communication may take place by way of a vehicle-2-vehicle server (V2V server) or by way of one of the connected vehicles (mesh network of the vehicles). Further notifications that may be of interest for determining the risk potential for an infrastructure (for example an approaching truck carrying hazardous goods) may be transmitted to the gateway or the processing unit by way of a superordinate control center (for example a traffic management computer). Weather information supplied with regard to the relevant infrastructure is also advantageously supplied by a weather services agency and taken into consideration for determining the risk potential.

If a risk potential or an existing hazard (for example a fire) for the infrastructure is identified by the processing unit, a corresponding action is triggered by the processing unit (for example switch traffic lights to "red" or close a barrier in order to prevent access into the infrastructure; or alert the fire department) and/or a corresponding warning signal is output. The warning signal may be displayed for example on display boards on the approach routes to the infrastructure.

Figure 1:
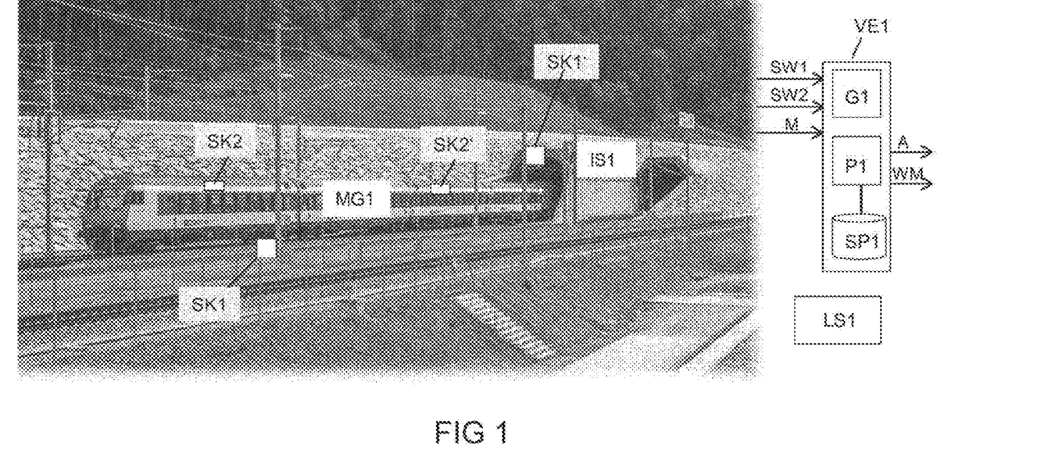
FIG. 1 shows a first exemplary infrastructure management system for identifying risk potentials within an infrastructure or for an infrastructure incorporating teachings of the present disclosure.

FIG. 1 illustrates a first exemplary infrastructure management system incorporating teachings of the present disclosure for identifying risk potentials within an infrastructure IS1 or for an infrastructure IS1. The infrastructure IS1 is for example a tunnel, a parking garage (multi-level parking lot, underground garage) or a ferry, in particular suitable for transporting vehicles (motor vehicles, trains). The first exemplary infrastructure management system comprises:

a dedicated (for example static, installed in or attached to the infrastructure) sensor system SK1, SK1' for identifying risk potentials within the infrastructure IS1 or for the infrastructure IS1;

a gateway G1 (for example an interface) configured to receive sensor values SW2 that originate from sensors SK2, SK2' of mobile devices MG1 that are temporarily located within the infrastructure IS or within a defined range (for example within a defined radius, or within a defined range) from the infrastructure IS;

a processing unit VE1 (for example a correspondingly configured server), configured to receive the sensor values SW1 that are reported by the dedicated sensor system SK1, SK1', and configured to receive the sensor values SW2 of the mobile devices MG1 that are provided by the gateway G1, and further configured to analyze the received sensor values SW1, SW2 in order to identify risk potentials for the infrastructure IS1 or within the infrastructure IS1.

The mobile device MG1 illustrated in accordance with FIG. 1 is a train and the infrastructure IS1 is a tunnel which the train MG1 is entering. The train MG1 comprises a dedicated sensor system SK2, SK2', for example smoke and/or fire detectors, which are located in the rail cars of the train MG1.

As soon as the fire detectors SK2, SK2' of the train MG1 arrive in the proximity of the infrastructure IS1 (in other words of the tunnel), the fire detectors SK2, SK2' of the train MG1 are incorporated into the safety infrastructure of the tunnel IS1. In other words, the sensor values SW2 that are supplied by the fire detectors SK2, SK2' of the train MG1 are also used for identifying risk potentials for the infrastructure IS1. The sensor values SW2 that are supplied by the fire detectors SK2, SK2' of the train MG1 may be received by way of a correspondingly configured gateway G1 (for example a correspondingly configured wireless interface) and transmitted to the processing unit VE1 of the infrastructure management system (for example a control center for monitoring the infrastructure of the tunnel IS1). The sensor values SW1 that originate from a sensor system SK1, SK1' that is dedicated to the infrastructure IS1 may also be received by way of the gateway G1 and transmitted to the processing unit VE1 for processing and analysis. The dedicated sensor system SK1, SK1' is fixedly installed in the tunnel or attached in a dedicated manner for the tunnel. The sensor system SK1, SK1' may be for example a camera SK1 that is mounted at the tunnel entrance or fire detectors SK1' that are attached in the tunnel IS1. Optionally, notifications M (for example a notification regarding an approaching hazardous load) from a superordinate control center LS1 (for example a traffic management center) may be provided for the processing unit VE1 of the infrastructure management system, and may also be used for determining the risk potential for the tunnel IS1.

The processing unit VE1 (for example a correspondingly configured server, having a processor P1 and memory SP1) is configured to receive the sensor values SW1 that are reported by the dedicated sensor system SK1, SK1' and said processing unit is configured to receive the sensor values SW2 of the mobile devices MG1 that are provided by the gateway G1, and further configured to analyze the received sensor values SW1, SW2 in order to identify risk potentials for the infrastructure IS1 (for example for the tunnel illustrated in FIG. 1) or within the infrastructure IS1.

In some embodiments, the processing unit VE1 comprises correspondingly configured hardware and software in order to use methods of artificial intelligence (for example decision tables, empirical database, neuronal models or networks, self-learning systems, deep learning) in order to identify as quickly as possible hazards or risk potentials for the tunnel and to initiate appropriate measures (e.g. preventative measures). The measures initiated by the processing unit VE1 may be actions A (for example blocking the tunnel entrance; notifying the police or informing safety organizations) and/or alarm signals WM (for example displaying a warning signal or hazard alarm on a display at the tunnel entrance). The actions A and/or the warning signals WM are advantageously initiated or output.

The train MG1 or the sensor system SK2, SK2' that is located in the train MG1 is configured to automatically connect to the gateway G1 if the train MG1 is located within the infrastructure IS1 or within a defined range (for example radius or distance) from the infrastructure IS1. The radius or the distance may be 300 m for example. The train MG1 or the sensor system SK2, SK2' that is located in the train MG1 is configured so as only to connect to the gateway G1 after confirmation by the train. The confirmation may be provided for example by the train driver or the conductor.

Optionally, a connection between the gateway G1 (interface) and the train MG1 only takes place after confirmation by the gateway G1 or by the infrastructure management system. Consequently, the infrastructure management system may selectively choose from which trains or train types the sensor system SK2, SK2' is to be incorporated for determining the risk potentials. The infrastructure IS1 may be a tunnel, a multi-level parking lot, an underground garage, a parking garage, a parking lot or a ferry.

The mobile device MG1 may be a vehicle (train, car, truck) equipped with a corresponding sensor system SK2, SK2'. In some embodiments, the mobile device MG1 may be a mobile communication terminal (for example a smartphone). Mobile communication terminals are equipped with sensor systems (for example GPS, movement sensors, camera, barometer, temperature sensor), which are used for identifying risk potentials within the infrastructure IS1 or for the infrastructure IS1. Furthermore, notifications regarding risks or hazards may be transmitted via voice messages or text messages to the gateway of the infrastructure management system by way of a mobile communication terminal.

In some embodiments, the gateway G1 is configured to receive notifications M from a vehicle-to-vehicle server and/or from a traffic management computer LS1, and the processing unit VE1 is configured, during the analysis of the risk potential for the infrastructure IS1 or within the infrastructure IS1, to use the notifications that are received from the vehicle-to-vehicle server or from the traffic management computer LS1.

In some embodiments, the gateway G1 (for example a wireless interface with corresponding software) is configured to receive sensor values SW2 that originate from sensors of mobile devices MG1 (for example a train) that are temporarily located within the infrastructure IS1 (for example a tunnel) or within a defined range (for example radius) from the infrastructure IS1; and further configured to transmit the received sensor values SW2 to the processing unit VE1 for analyzing the sensor values SW2 and SW1 in order to identify the risk potential for the infrastructure IS1.

In some embodiments, the gateway G1 is further configured to receive notifications from a vehicle-to-vehicle server (V2V-S; cf. FIG. 2) and/or from a traffic management computer LS1 and to transmit said notifications to the processing unit VE1. A dedicated sensor system that is part of the tunnel IS1 may also be provided on the access routes to the tunnel (in the case of a railroad tunnel on the rails that lead to the tunnel), for example for monitoring the bogie of the trains for hot runners. This takes place by way of a so-called hot spot detection procedure with which also concealed fires or malfunctioning electrical components on the train MG1 are at least in part detected at the same time.

This hot spot detection procedure may be realized for example using infrared cameras that observe the approaching train MG1 from the left-hand side and the right-hand side and from above. The sensor values SW1 and sensor values SW2 that are supplied by the infrared cameras and are supplied for example by temperature sensors in the train MG1 are analyzed by the processing unit VE1 and evaluated with regard to a risk potential that could possibly be caused by the approaching train. By way of using sensor values outside and inside the train MG1, it is possible to localize the source of the hazard more precisely, to estimate and evaluate the risk potential more efficiently and to react thereto in a more purposeful manner by way of corresponding actions A or warning signals WM from the processing unit VE1. Warning signals WM are also advantageously output in the train MG1, for example by way of loudspeaker announcements. The hot spot detection procedure takes place so far in advance of the tunnel entrance that it is still possible to prevent the train MG1 entering into the tunnel.

Figure 2:
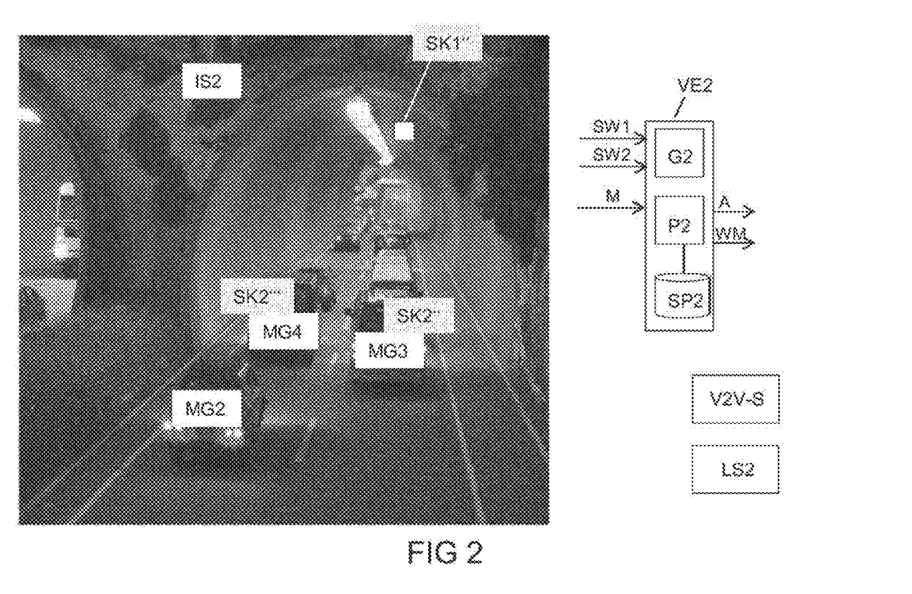
FIG. 2 shows a second exemplary infrastructure management system for identifying risk potentials within an infrastructure or for an infrastructure incorporating teachings of the present disclosure.

FIG. 2 illustrates a second exemplary infrastructure management system incorporating teachings of the present disclosure for identifying risk potentials within an infrastructure IS1 or for an infrastructure IS2. In accordance with FIG. 2, the infrastructure IS2 may be a tunnel for the through-passage of motor vehicles. The second exemplary infrastructure management system comprises:

a dedicated (for example static, installed in or attached to the infrastructure) sensor system SK1" for identifying risk potentials within the infrastructure IS2 or for the infrastructure IS2;

a gateway G2 (for example interface) configured to receive sensor values SW2 that originate from sensors SK2", SK2'" of mobile devices MG2-MG4 that are temporarily located within the infrastructure IS2 or within a defined range (for example within a defined radius, or within a defined range) from the infrastructure IS2; and a processing unit VE2 (for example correspondingly configured server), configured to receive the sensor values SW1 that are reported by the dedicated sensor system SK1", and configured to receive the sensor values SW2 of the mobile devices MG2-MG4 that are provided by the gateway G2, and further configured to analyze the received sensor values SW1, SW2 in order to identify risk potentials for the infrastructure IS2 or within the infrastructure IS2.

The mobile devices MG2-MG4 illustrated in accordance with FIG. 2 are motor vehicles and the infrastructure IS2 is a tunnel which the motor vehicles MG2-MG4 are entering. By way of example and not limiting thereto, in the illustration in accordance with FIG. 2, the vehicle MG3 is equipped with the sensor system SK2" and the vehicle MG4 is equipped with the sensor system SK2'". These sensor systems SK2", SK2'" that are associated with the respective vehicles may be for example temperature sensors or cameras. As the vehicles MG3, MG4 approach the tunnel IS2, they become incorporated into the infrastructure management system of the tunnel IS2 when they are within a predetermined range from the tunnel IS2 (for example from 300 m onwards) and the sensor values SW2 that are supplied by the sensor system SK2", SK2'" together with the sensor system SK1" (for example a fire detector or gas detector) that is installed in the tunnel are used by the processing unit VE2 of the infrastructure management system for the tunnel IS2 in order to detect risk potentials or hazards for the tunnel IS2.

In some embodiments, the gateway G2 (for example a wireless interface with corresponding software) is configured to receive sensor values SW2 that originate from sensors of mobile devices MG3, MG4 (for example motor vehicles) that are temporarily located within the infrastructure IS2 (for example a tunnel) or within a defined range (radius) from the infrastructure IS2; and further configured to transmit the received sensor values SW2 to the processing unit VE2, so as to analyze the sensor values SW2 and SW1 in order to identify the risk potential for the infrastructure IS2.

In some embodiments, the gateway G2 is further configured to receive notifications from a vehicle-to-vehicle server V2V-S and/or from a traffic management computer LS2 and to transmit said notifications to the processing unit VE2. The notifications M are advantageously received at the gateway G2 by way of a wireless interface.

In some embodiments, the processing unit VE2 comprises accordingly configured hardware (for example a processor P2, a memory device SP2) and software in order to use methods of artificial intelligence (for example decision tables, empirical database, neuronal models of networks, self-learning systems, deep learning) in order to identify hazards or risk potentials for the tunnel as quickly as possible and to initiate corresponding measures (advantageously preventative measures). The measures initiated by the processing unit VE2 may be actions A (for example blocking entrance to the tunnel; notifying the police or notifying safety organizations, and/or a traffic management center, and/or a radio station) and/or warning signals WM (for example displaying warning signals or hazard signals on a display at the tunnel entrance). The actions A and/or the warning signals WM are advantageously initiated or output.

Notifications M that are provided by a vehicle-to-vehicle server V2V-S and/or by a traffic management computer LS2 may be used for identifying risk potentials for the infrastructure IS2 or within the infrastructure IS2. Optionally, notifications M that are provided by a vehicle MG2-MG4, which is networked to the other vehicles MG2-MG4, may also be used for identifying risk potentials for the infrastructure IS2 or within the infrastructure IS2.

Figure 3:
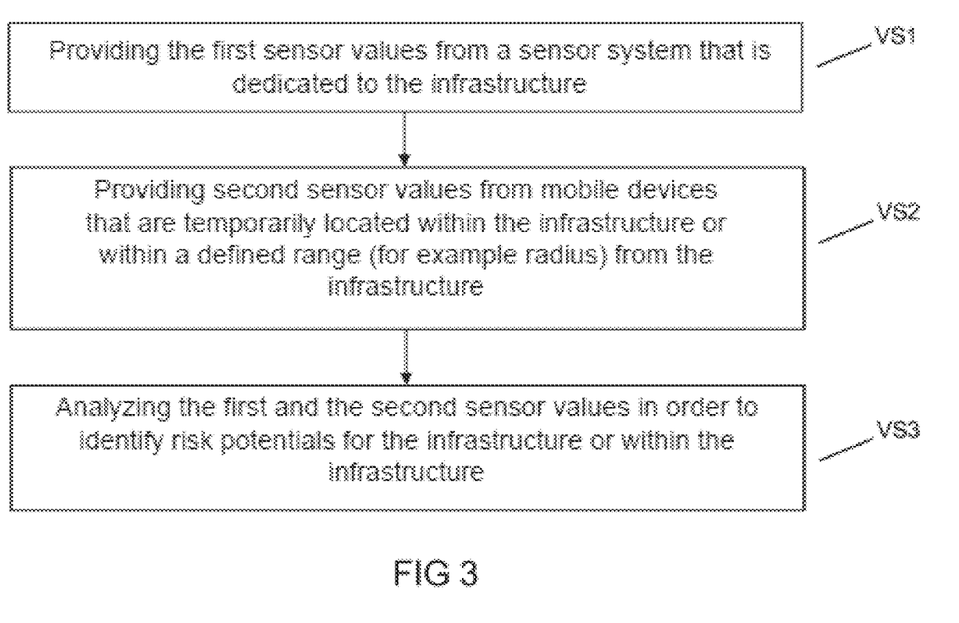
FIG. 3 shows an exemplary flow diagram for a method for identifying risk potentials within an infrastructure or for an infrastructure incorporating teachings of the present disclosure.

FIG. 3 illustrates an exemplary flow diagram for a method for identifying risk potentials within an infrastructure or for an infrastructure (for example a tunnel, ferry, parking garage) incorporating teachings of the present disclosure. The method comprises the following method steps:

(VS1) providing first sensor values from a (static, installed) sensor system that is dedicated to the infrastructure;

(VS2) providing second sensor values from mobile devices that are temporarily located within the infrastructure or within a defined range (radius) from the infrastructure; and (VS3) analyzing the first and the second sensor values in order to identify risk potentials for the infrastructure or within the infrastructure.

In some embodiments, in order to identify risk potentials for an infrastructure more quickly, the sensor system that is provided in infrastructures (for example parking garages, ferries, tunnels) and is usually statically installed (for example cameras, temperature sensors, smoke detectors) for identifying risks is temporarily augmented with a sensor system of mobile devices (for example motor vehicles, trains) that are only temporarily located in the infrastructure or are approaching the infrastructure (for example a train or motor vehicle traveling through the tunnel).

As a consequence, the reaction time window is inter alia extended in order to react quickly to recognized potential hazards or risks. In order to minimize the risk to the infrastructure, mobile sensors that are not part of the fixedly installed sensor inventory (for example smoke detectors of the fire alarm installation) of the infrastructure and are only temporarily located around or in the infrastructure are used in a cooperative manner with the dedicated sensor system that is provided in the infrastructure and its sensor values are used for identifying risk potentials. The present invention renders it possible to augment the sensor system that is provided for an infrastructure by a mobile or temporary sensor system of the mobile devices. The sensor values may be provided by suitable wireless connections, wherein the first sensor values that originate from the sensor system that is installed in the infrastructure (for example fire and/or smoke detectors in a tunnel) may also be provided in a wire-connected manner.

In some embodiments, in order to identify risk potentials for the infrastructure or within the infrastructure, the first and the second sensor values are analyzed using suitable hardware (computers, memory devices, communication connections) and software (for example programs of artificial intelligence, deep learning algorithms, decision tables based on empirical values, etc.). In the event that hazards or risk potentials are identified, appropriate actions that are tailored to suit the respective risk are advantageously triggered (for example output warning signals, closing access routes to the infrastructure, etc.).

The second sensor values may be provided by a vehicle (train, motor vehicle) and/or by a mobile communication terminal (for example a smartphone). In order to identify risk potentials for the infrastructure or within the infrastructure, notifications may be used that are provided by a vehicle-to-vehicle server and/or by a traffic management computer. For example, notifications regarding a truck that is carrying hazardous goods and is approaching the infrastructure.

In some embodiments, in order to identify risk potentials for the infrastructure or within the infrastructure, notifications are also advantageously used that are provided by a mobile device (in particular a vehicle), said mobile device being networked with other mobile devices (in particular vehicles), for example by a car-to-car (C2C) or vehicle-to-vehicle (V2V) connection. The connection of the vehicles to one another or to the infrastructure management system may be provided for example based on GSM technology, based on WLAN technology or based on UMTS technology.

Mobile objects (for example vehicles, trains) in/at/around infrastructures (for example tunnels, ferries, multi-level parking lots, buildings, campus areas) usually have a dedicated number of sensors. These movable sensors that are not part of the infrastructure have hitherto not been used in an optimized manner to protect infrastructures. The object of the present invention is to use these temporary mobile sensors outside the sensor inventory that is fixedly installed in the infrastructure (for example smoke detectors of the fire alarm system) in a cooperative manner and to exploit their capabilities to minimize the risks for the infrastructure. In order for it to be possible to use the sensor measurement values of the objects that are cooperating but are not part of the infrastructure, a data connection is required. Advantageously, this may be a wireless connection, but a cable connection may also be realized (example: electric vehicles that are connected by means of a charging cable and that use a charging device that is part of the infrastructure and may in turn communication with the infrastructure or authorized service provider).

In some embodiments, the infrastructure or the infrastructure management system comprises a gateway, for example an "alarm messaging gateway". This gateway may receive on different connection planes warning signals/alarm signals from different sensors and/or news channels (for example Twitter or SMS). This gateway may allow the received data to be checked for plausibility or analyzed optionally via analysis on one or multiple servers. The server or servers (processing unit or processing units) may be dispersed locally in the infrastructure or in a computer center of the/for the infrastructure or "in the cloud". During the analysis of the sensor values, empirical values, reputation, correlation with other accumulated sensor values may be taken into consideration. In some embodiments, the gateway transmits in turn data (such as for example evaluation and/or handling recommendations and/or action commands) to management station software that is part of the infrastructure (for example building/campus area) and/or designated persons (for example voice message on the telephone; push-notification on the smartphone).

Example

Electrically operated vehicles, for example local buses or also passenger cars, or even electric bicycles, are usually parked at the end of a journey in a parking hall (garage). A risk potential originating from these vehicles was hitherto only identified when it was already too late: a smoke detector installed in the parking hall would detect a vehicle fire and raise the alarm.

Now: By using alarm-raising notifications output by the vehicle, it is possible using the method described in the present disclosure to take action before the vehicle catches fire. The vehicle (or rather its battery management system (BMS) identifies for example an excessively high voltage in the cells of the battery. This could lead to a fire. Even before a fire breaks out, it is identified that a fire could start. The best point in time to take action. A communication module in the vehicle reports the risk potential that is identified by the BMS and the irregularity of the measurement values to one or multiple receivers. This may be the vehicle manufacturer or authorized service provider who transmits the hazard alarm in a purposeful manner, (the position of the vehicle is usually known (for example by way of GPS location)) to the on-site alarm-raising/operational infrastructure (on receipt of which for example the infrastructure fire alarm system may activate an initial alarm and/or isolate the relevant fire section using structural fire protection devices).

Prior to transmitting the identified measurement values, the data may be evaluated and compared for example with empirical values in order to limit the risk of an erroneous alarm being raised. The data may be evaluated in the vehicle itself and/or ideally on one or multiple servers outside the vehicle. It is likewise possible to directly couple (in this example) the vehicle to the on-site alarm-raising device or to the infrastructure/building management system. In other words, as it enters, the vehicle logs directly onto the system or logs off as it exits.

Various embodiments may provide the following features:
- an infrastructure or building management system is notified of changing risk potentials (for example electric vehicles that have joined the infrastructure or are no longer present) and may make appropriate precautions (for example dynamic escape route calculation based on the increased risk potential in zone X).
- an alarm is raised directly by static or dynamic objects that "themselves" identify a risk and communicate accordingly.
- a sensor system that is installed in these objects is used for augmenting the infrastructure sensor system (for example incorporating cameras that are located in vehicles into the video monitoring system of the infrastructure; for example using air quality measuring sensors)

technical devices that are installed in these objects are used for augmenting the technical device that is provided in the infrastructure (for example incorporating the vehicle lighting system and audio system/horn so as to augment the warning devices of the infrastructure.

incorporating existing mobile smoke detectors for example (for example such as found in trains or service buses) into the existing safety infrastructure as soon as these sensors arrive within reach of the infrastructure. In so doing, such a detector is incorporated as an "associated" sensor into the existing installation (virtual detector line). As a consequence, it is furthermore possible for example for a cloud solution such as MindSphere to operate generally as a virtual hazard detection system by using the connected detectors or sensors that are provided for this purpose.

LIST OF REFERENCE CHARACTERS

IS1, IS2 Infrastructure
MG1-MG4 Mobile device
SK1, SK1', SK1" Dedicated sensor system for the infrastructure
SK2, SK2', SK2", SK2''' Sensor system
SW1, SW2 Sensor value
VE1, VE2 Processing unit
G1, G2 Gateway
P1, P2 Processor
SP1, SP2 Memory device
A Action
WM Warning signal
M Notification
V2V-S Vehicle-to-vehicle server
LS1, LS2 Control center
VS1-VS3 Method step

What is claimed is:

1. A gateway comprising a transceiver configured to:
automatically connect to sensors associated with motor vehicles when the motor vehicles enter a defined range of an infrastructure;
wherein the motor vehicles include automobiles or trucks;
when the motor vehicles are in the defined range of the infrastructure and the gateway is automatically connected to the sensors associated with the motor vehicles:
receive sensor values originating from the sensors associated with the motor vehicles; and
transmit the received sensor values to a processing unit for collective processing with sensor values from a sensor system dedicated to the infrastructure to identify a risk potential for the infrastructure.

2. The gateway as claimed in claim 1, further configured to receive notifications from a vehicle-to-vehicle server and/or a traffic management computer and to transmit said notifications to the processing unit.

3. A method for identifying risk potentials for an infrastructure, the method comprising:
gathering a first set of sensor values by a sensor system dedicated to the infrastructure;
automatically connecting a gateway to one or more sensors of an automobile or a truck if the automobile or truck enters a defined range of the infrastructure; and
when the automobile or truck is in the defined range of the infrastructure and the one or more sensors of the automobile or truck are automatically connected to the gateway:
gathering a second set of sensor values by the one or more sensors of the automobile or truck; and
collectively analyzing the first set of sensor values generated by the sensor system dedicated to the infrastructure and the second set of sensor values generated by the one or more sensors of the automobile or truck to identify risk potentials for the infrastructure.

4. The method as claimed in claim 3, wherein the second sensor values are generated by a vehicle and/or a mobile communication terminal.

5. The method as claimed in claim 3, further comprising using notifications provided by a vehicle-to-vehicle server and/or by a traffic management computer.

6. The method as claimed in claim 3, further comprising using notifications provided by a mobile device networked to other mobile devices.

7. The method as claimed in claim 3, further comprising triggering an action preventing access to the infrastructure if a risk potential for the infrastructure identified by the analysis of the first set of sensor values and the second set of sensor values exceeds a preset level of risk potential.

8. An infrastructure management system for identifying risk potentials within an infrastructure or for the infrastructure, the system comprising:
a dedicated sensor system of the infrastructure for identifying risk potentials, the dedicated sensor system configured to generate first set of sensor values;
a gateway configured to receive (a) the first set of sensor values from the dedicated sensor system and (b) a second set of sensor values from sensors associated with mobile devices temporarily located within a defined range of the infrastructure;
wherein the mobile devices include automobiles or trucks;
wherein the sensors associated with the mobile devices are not part of the infrastructure;
wherein the sensors associated with the mobile devices comprise smoke detectors, cameras, or temperature sensors;
wherein the sensors associated with the mobile devices automatically connect to the gateway if they are located within the defined range of the infrastructure;
a processing unit in communication with the gateway configured to, when the sensors associated with the mobile devices are located within the defined range of the infrastructure and automatically connected to the gateway, collectively analyze (a) the first set of sensor values generated by the dedicated sensor system and (b) the second set of sensor values generated by the sensors associated with the mobile devices to identify risk potentials for the infrastructure.

9. The system as claimed in claim 8, wherein the mobile devices only connect to the gateway after a particular mobile device has provided confirmation.

10. The system as claimed in claim 8, wherein connection between the gateway and a particular mobile device only takes place after confirmation by the gateway.

11. The system as claimed in claim 8, wherein the infrastructure comprises an item selected from the group consisting of: a tunnel, a multi-level parking lot, an underground garage, a parking garage, a campus, and a ferry.

12. The system as claimed in claim 8, wherein:
the gateway receives notifications from a vehicle-to-vehicle server and/or from a traffic management computer; and
the processing unit, during the analysis of the risk potential for the infrastructure, uses the notifications received.

13. The system as claimed in claim 8, wherein the processing unit triggers an action preventing access to the infrastructure if a risk potential for the infrastructure identified by the analysis of the first set of sensor values and the second set of sensor values exceeds a preset level of risk potential.

* * * * *